United States Patent [19]

Gupta et al.

[11] 4,432,957
[45] Feb. 21, 1984

[54] METHOD OF PRODUCING SILICON CARBIDE BODIES

[75] Inventors: Ashok K. Gupta; Ernö Gyarmati, both of Jülich; Hermann Kreutz, Monchen-Gladbach; Rudolf Münzer, Alsdorf; Aristides Naoumidis; Hubertus Nickel, both of Jülich, all of Fed. Rep. of Germany

[73] Assignee: Kernforschungsanlage Jülich Gesellschaft mit beschränkter Haftung, Jülich, Fed. Rep. of Germany

[21] Appl. No.: 352,007

[22] Filed: Feb. 24, 1982

[30] Foreign Application Priority Data

Mar. 5, 1981 [DE] Fed. Rep. of Germany ....... 3108259

[51] Int. Cl.$^3$ .................. C01B 31/36; C04B 35/56
[52] U.S. Cl. ................................ 423/345; 501/88; 501/90
[58] Field of Search ............... 423/345; 501/88, 90

[56] References Cited

U.S. PATENT DOCUMENTS 3,275,722  9/1966  Popper ............................... 423/345
4,265,843  5/1981  Dias et al. ......................... 423/345

FOREIGN PATENT DOCUMENTS 2133044  1/1973  Fed. Rep. of Germany.
2707299  9/1977  Fed. Rep. of Germany.
2910628  1/1980  Fed. Rep. of Germany.
54-8191  1/1979  Japan.

OTHER PUBLICATIONS

Poch et al.; "The Formation of Silicon Carbide from Silicon Dioxide and Carbon", Berichte der Deutschen Keramischen Gesellschaft pp. 413-426, 1962.
Phillips, E. et al.; "The Fabrication and Burst Testing of Reaction-Bonded Silicon Carbide Tubes", Atomic Energy of Canada Limited AECL 3462, 1971.

*Primary Examiner*—Mark Bell
*Attorney, Agent, or Firm*—Frishauf, Holtz, Goodman & Woodward

[57] ABSTRACT

A significant improvement of the silicon impregnation depth of a carbon precursor body in the siliconizing thereof to make a silicon carbide body is obtained, as well as an accelerated conversion into silicon carbide if activated carbon is used in whole or in part as the carbon powder component of the precursor body. The molding material is preferably 20 to 60% by weight of binder and 20 to 70% activated carbon. This molding material may also usefully contain 10 to 60% by weight of α-silicon carbide, which may be previously made by siliconizing carbon powder.

6 Claims, No Drawings

METHOD OF PRODUCING SILICON CARBIDE BODIES

This invention concerns a method for making silicon carbide bodies by siliconizing a molded carbon precursor body.

The impregnation of graphitic precursor bodies with gaseous or liquid silicon for converting the carbon into silicon carbide has been known for a long time and is the subject of countless publications and patent documents.

The manufacture of a "green" body of siliconizable carbon material was comprehensively described by Popper in British Pat. No. 866,813 and U.S. Pat. No. 3,275,722 and by P. Popper and D. G. S. Davies in Powder Metallurgy, Vol. 8, page 113 (1961). As there described the filler, a mixture of colloidal graphite and silicon carbide powder of different grain size was subjected to wet homogenizing in a ball mill. The homogenized powder was then dried. A binder was then added, for example, water soluble cellulose, wax emulsion or polyvinyl alcohol to convert the finely-ground dry material into a press powder. The pressing of the molded body is then done at pressures of 50 to 70 megapascals (MPa). The pressed body is then dried at from 40° C. or up to 110° C. until the binder was fully removed.

As described by M. Couach in German OS No. 2,058,239, a precursor body of graphite powder of a particle size from 1 to 100 $\mu$m and the binders such as resin gum, sizing material, starch, ethylcellulose, linseed oil or the like was produced by agglomeration, drying and pressing. The porous precursor body thus obtained was then subjected to a treatment with hot hydrocarbons. Pyrocarbon is then precipitated and the density of the body reaches a value between 1.4 and 1.5 g.cm$^{-3}$.

E. Phillips and W. Hutchings, AECL 3462 of 1971, described taking SiC powder of different particle-size fractions, colloidal graphite, lampblack and sugar molasses or phenolic resin as starting materials. After homogenizing in i-propanol the resulting brew is dried and the "cakes" obtained are pulverized. By sifting and mixing of the different sieve mesh fractions a pressing powder is obtained from which pressed bodies are produced by pressing at between 6.5 and 105 MPa. These are then warmed at 150° C. for two hours before the siliconizing step. According to H. Luhleich and others (DE-OS No. 21 33 044) a binder such as phenolformaldehyde resin, pitch, tar or the like is dissolved in an organic solvent and a powder filler of petroleum coke, electrographite, carbon black or the like is stirred into the binder solution. Water is introduced into the fine suspension, causing the binder to be precipitated and deposited on the filler. The mud thus obtained is then dried and then pulverized. The powder can then be molded, either by moistening with a methanol-water mixture or by a treatment with methanol vapor in molds. The molded bodies are then dried and coked.

N. G. Schrewelius has described (DE-OS No. 14 46 978) the manufacture of porous siliconizable bodies in which graphite and amorphous carbon, along with cubic and hexagonal SiC are provided as fillers.

W. B. Hillig and C. R. Morclock (DE-OS No. 27 07 299), in the manufacture of machinable cast bodies, utilized carbon or graphite fibers, coked plant fibers, lampblack, finely divided carbon, wood, charcoal and the like as reaction components in conversion to silicon carbide by means of liquid silicon.

The countless efforts described in the literature indicate that a generally recognized particular method for the manufacture of silicon carbide molded bodies does not yet exist and that an optimization is still being sought in a variety of ways. In this art, the density and the penetration through the body of the conversion to silicon carbide can be regarded as a measure for the quality of the product. The shape stability of the body in siliconizing also plays an important role as a standard of quality.

SUMMARY OF THE INVENTION

It has now been determined that a significantly improved depth of impregnation of the carbon precursor body as well as an accelerated conversion into silicon carbide and a high degree of shape stability in siliconizing are all produced in when activated carbon is used for the manufacture of the carbon molded body. Thus, for example, a carbon precursor body produced with the use of activated carbon, in comparison to a corresponding body produced with charcoal, exhibits an impregnation depth that has been increased by a factor of 2.

Briefly, in accordance with the invention, in the manufacture of silicon carbide bodies by siliconizing a carbon precursor body, the precursor body is produced by starting with a carbon powder formed either wholly or partly, but at least 20% by weight, from activated charcoal which may if desired contain between 10 and 60% by weight of silicon carbide powder.

A body produced in this manner is distinguished by a deeply pentrating siliconizing and a high density. Whereas in known carbon precursor bodies, the values of density obtained by impregnation depths of 15, 10 and 5 mm are respectively 2.60, 2.65 and 2.7 g/cm$^3$ for the silicon carbide obtained, there is obtained according to the invention by impregnating depths of 30 mm (impregnation from both sides) values of density that closely approach 3 g/cm$^3$. The finished articles in these cases show good fidelity to shape and retention of dimensions, as could be determined by making test rods that maintained not only their dimensions but also their shapes. Rods prepared by other methods, in contrast, showed a considerable percentage of deviation after siliconizing (bent rods).

The carbon powder used for making the carbon precursor body consists according to the invention, of activated carbon to the extent of at least 20%, while the remainder, if any, of the carbon can provided by conventional fillers such as graphite, electrographite, petroleum coke, carbon black, charcoal and the like. These conventional fillers, particularly when they make up more than 50% of the carbon powder, are subjected to an activating pretreatment with acid, lyes, solvents or other activating chemicals and/or defatting agents. Thus, for example, there can be used as the starting material a mixture of 20% activated carbon and 80% carbonblack which has been treated with ammonia or with a fat-removing agent. Any coke component used along with the materials just mentioned should be pretreated with oxidizing acids such as nitric acid or sulfuric acid. This use of conventional carbonbase fillers variously pretreated can be warranted on a cost basis, because of the advantage of providing a carbon powder material that is thereby practically 100% activated carbon even though only 20% or somewhat more may be commercial grade activated carbon.

According to the invention, silicon carbide can be added if desired to the mass of activated carbon and cokable binder that is to be molded. The binder component of the mass lies at values from 20 to 60% by weight of the powder or powder mixture, preferably at about 30% by weight, the exact amount depending upon the starting material, because mixed powders with higher silicon carbide content require less binder. The activated carbon content constitutes thus between 20 and 70% of the mass to be molded, preferably about 40% in the case of a mixed powder that may contain between 10 and 60% by weight of silicon carbide. The binder is mixed as uniformly as possible with the starting powder so that the precursor body may be molded at only moderate pressure. The precursor bodies carefully "dried" and then coked by procedures known in the art and then siliconized by likewise known procedures, which may be done by immersion and conversion in molten silicon or by siliconizing with gaseous silicon. For the temperatures and duration of heat treatment in these steps, reference is made for convenience to our co-pending companion application, attorney docket 82048/W claiming the priority of German application P 31 08 266.1.

The invention is further described by reference to particular examples given below.

EXAMPLE 1

A mixture of 40% phenolformaldehyde resin and 60% activated carbon was mixed in accordance with the current and pressed to make a prism 30 mm thick. After coking, the precursor body was siliconized by immersion according to the conventional method. The silicon carbide body was then cut down the middle, polished and microscopically examined. The conversion into silicon carbide was uniform over the entire cross section. The density of the material was 2.5 g.cm$^{-3}$. The sample showed a dimensional stability within 0.5% and an excellent shape stability.

EXAMPLE 2

A prism such as the one made in Example 1 was made from a mixture of 30% gasoline cracking residue
30% α-silicon carbide
40% activated carbon.
After siliconizing, the material exhibited outstanding uniformity and at a density of 3.05 g.cm$^{-3}$. The dimensional stability was within 0.3%.

EXAMPLE 3

Prisms with the dimensions of 60×4 and 5×3.5 mm were made from a mixture of
30% antracite tar pitch
20% activated carbon
50% α—silicon carbide.
After siliconizing, the material had the following properties:
Density: 3.10 g.cm$^{-3}$
Dimensional stability: 0.4%
Shape stability: perfect

EXAMPLE 4

A wafer with an edge length of 4 cm was made from a mixture of
30% phenolformaldehyde resine
70% activated carbon.
Properties of the siliconized material:
Density: 2.95 g.cm$^{-3}$
Dimensional stability: 0.5%
Shape stability: perfect
Homogeniety: uniform overall Although the invention has been described with reference to particular illustrative examples, it will be understood that further variations are possible within the inventive concept.

We claim:

1. Method of making silicon carbide bodies by impregnating and siliconizing with molten silicon, or by siliconizing with gaseous silicon, a precursor carbon-containing body incorporating a coked binder, in which method there is the improvement that a carbon powder which contains at least 20% by weight of activated carbon is the starting material which together with said binder, before coking of said binder, is used for molding the carbon-containing precursor body.

2. Method as defined in claim 1, in which said starting material also contains between 10 and 60% by weight of carbon powder previously converted to silicon carbide.

3. Method of making silicon carbide bodies by impregnating and siliconizing with molten silicon or by siliconizing with gaseous silicon, a precursor carbon-containing body also containing α-silicon carbide and incorporating a coked binder, in which method there is the improvement that a mixture of carbon powder, which contains at least 20% by weight of activated carbon, with 10 to 60% by weight of α-silicon carbide powder, is the starting material which together with said binder, before coking of said binder, is used for molding the carbon-containing precursor body.

4. Method as defined in claim 3 in which the molding material from which said precursor body is made contains between 20 and 60% by weight of a cokable binder and between 20 and 70% of activated carbon.

5. Method as defined in claim 2 in which the molding material from which said precursor body is produced contains about 30% of cokable binder.

6. Method as defined in claim 4 in which the molding material from which said precursor body is produced contains about 40% of activated carbon.

* * * * *

UNITED STATES PATENT AND TRADEMARK OFFICE
CERTIFICATE OF CORRECTION

PATENT NO. : 4,432,957
DATED : February 21, 1984
INVENTOR(S) : Ashok K. Gupta et al.

It is certified that error appears in the above-identified patent and that said Letters Patent is hereby corrected as shown below:

Cancel Claim 2, and insert Claim 2 as shown below:

-- 2. Method as defined in claim 1, in which the molding material from which said carbon-containing precursor body is produced contains between 20 and 60% by weight of a cokable binder, and between 20 and 70% of activated carbon. --.

Column 3, between lines 2 and 3 insert
-- serial no. 352,006, filed February 24, 1982 --

Signed and Sealed this

Seventh Day of August 1984

[SEAL]

Attest:

GERALD J. MOSSINGHOFF

Attesting Officer

Commissioner of Patents and Trademarks